US012558972B2

(12) United States Patent     (10) Patent No.:   US 12,558,972 B2

Hadjidj     (45) Date of Patent:    Feb. 24, 2026

(54) ELECTRICAL GENERATION ARCHITECTURE FOR HYBRIDISED TURBOMACHINE

(71) Applicant: SAFRAN ELECTRICAL & POWER, Blagnac (FR)

(72) Inventor: Djemouai Hadjidj, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/576,512

(22) PCT Filed: Jul. 5, 2022

(86) PCT No.: PCT/FR2022/051346

§ 371 (c)(1),
(2) Date: Jan. 4, 2024

(87) PCT Pub. No.: WO2023/281210

PCT Pub. Date: Jan. 12, 2023

(65) Prior Publication Data

US 2024/0326609 A1     Oct. 3, 2024

(30) Foreign Application Priority Data

Jul. 6, 2021    (FR) ...................................... 2107296

(51) Int. Cl.
| | |
|---|---|
| *B64D 27/02* | (2006.01) |
| *B64D 27/10* | (2006.01) |
| *B64D 27/33* | (2024.01) |

(52) U.S. Cl.
CPC ........... *B64D 27/10* (2013.01); *B64D 27/026* (2024.01); *B64D 27/33* (2024.01); *B60L 2200/10* (2013.01);

(Continued)

(58) Field of Classification Search
CPC ........ B64D 27/02; B64D 27/24; B64D 27/33; B64D 27/35; B60L 2210/20
See application file for complete search history.

(56) References Cited

U.S. PATENT DOCUMENTS

| | | | |
|---|---|---|---|
| 2016/0016670 A1* | 1/2016 | Sautreuil | ................ B64D 31/18 |
| | | | 903/904 |
| 2018/0112599 A1 | 4/2018 | Dalal | |

(Continued)

FOREIGN PATENT DOCUMENTS

| | | |
|---|---|---|
| EP | 3840205 A1 | 6/2021 |
| EP | 4092858 A1 | 11/2022 |

(Continued)

OTHER PUBLICATIONS

Search Report for International Application No. PCT/FR2022/051346 mailed Oct. 17, 2022.

*Primary Examiner* — Nicholas McFall
*Assistant Examiner* — Justin Michael Heston
(74) *Attorney, Agent, or Firm* — McDonald Hopkins LLC

(57) ABSTRACT

Electrical architecture for an aircraft with thermal/electrical hybrid propulsion, comprising, for each turbine engine: an aeroplane AC electrical network, at least one first electrical machine mechanically coupled to a high-pressure shaft of the turbine engine; at least one second electrical machine mechanically coupled to a low-pressure shaft of the turbine engine; a reversible AC/AC electrical energy conversion module; switch elements; and an electronic system for controlling the conversion module and the switch elements, configured to put the architecture: in at least one so-called "power distribution hybridisation" operating mode corresponding to a first configuration of the switch elements in which the at least one second machine is coupled to the aeroplane network and at least one first machine is coupled (Continued)

to the aeroplane network via the electrical energy conversion module.

5 Claims, 9 Drawing Sheets

(52) U.S. Cl.
CPC ....... *B60L 2210/20* (2013.01); *B60L 2220/42* (2013.01); *B64D 2221/00* (2013.01); *H02J 2310/44* (2020.01)

(56) References Cited

U.S. PATENT DOCUMENTS

| | | | | |
|---|---|---|---|---|
| 2021/0184589 A1* | 6/2021 | Abdesselam | ......... | H02M 5/297 |
| 2021/0391727 A1* | 12/2021 | Devautour | ............. | B64D 45/00 |
| 2022/0371532 A1* | 11/2022 | Huh | ....................... | B64D 27/18 |

FOREIGN PATENT DOCUMENTS

| | | | |
|---|---|---|---|
| WO | 2011051598 | A2 | 5/2011 |
| WO | 2020070438 | A1 | 4/2020 |
| WO | 2020174165 | A1 | 9/2020 |
| WO | 2021099720 | A1 | 5/2021 |

* cited by examiner

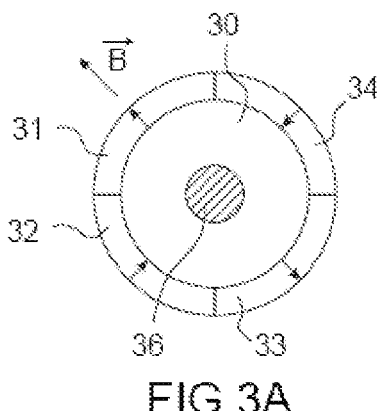
FIG.3A
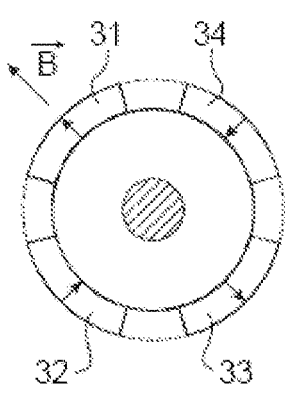
FIG.3B
FIG.3C

LPG1

LPG2

LPG1

LPG2

ELECTRICAL GENERATION ARCHITECTURE FOR HYBRIDISED TURBOMACHINE

CROSS-REFERENCE TO RELATED APPLICATIONS

This is the National Stage application of PCT international application PCT/FR2022/051346, filed on Jul. 5, 2022, which claims the priority of French Patent Application No. 2107296, filed Jul. 6, 2021, both of which are incorporated herein by reference in their entireties.

TECHNICAL FIELD

The present application relates to the field of electrical architectures for aircraft and proposes an improved electrical architecture making it possible in particular to supply alternating current to an aeroplane network of an aircraft with thermal/electrical hybrid propulsion from low-pressure and high-pressure shafts of a turbomachine.

PRIOR ART

More and more aircraft operate with hybrid propulsion systems, i.e. with a system comprising a turbomachine, and one or more electric generators and electric generators-motors.

A hybrid propulsion installation of an aircraft can include, for each turbine engine, several electrical distribution networks: a propulsion electrical distribution network, a non-propulsion electrical distribution network, and optionally a network for electrical distribution of loads of an electrified regulation system of the turbine engine.

The propulsion electrical distribution network is intended to supply equipment relating to the propulsion system, typically of high power. The propulsion electrical distribution network is generally of the DC type and with a high voltage level that depends on the powers involved.

The non-propulsion electrical distribution network is intended to supply electricity to the intermediate-power equipment, i.e. mainly equipment relating to the non-propulsion system, also referred to as "aircraft" loads. The non-propulsion electrical distribution network has an intermediate voltage level generally lower than the voltage level of the propulsion electrical distribution network. In some known architectures, this network is of the DC type.

It is typically sought to implement an electrical aircraft architecture interconnecting the energy sources available in the turbine engines and the body of the aircraft and making it possible to supply or take off a controlled power with one or more electric machines, to ensure compatibility of all these functions relating to propulsion with the functions of supplies of other energy requirements, and to provide optimised management of all these take-offs and supplies of energy with various energy sources and energy-storage means.

Electrical aircraft architectures making it possible to supply or take off a controlled power with one or more electric machines respectively on the high-pressure and low-pressure shafts have appeared. The document WO2020174165 (A1) emanating from the applicant presents for example such a type of architecture.

Such existing architecture solutions are however generally adapted to an aeroplane electrical distribution network of the HVDC type.

There is a need to supply an alternating-current electrical power to aeroplane loads and for optimum use of powers of the turbomachine shafts.

DESCRIPTION OF THE INVENTION

The present invention proposes an improved hybrid propulsion architecture making it possible to inject and take off power on the high- and low-pressure shafts of the turbine engines for the propulsion requirements of the aircraft, to supply electrical power to the loads of the aircraft, and advantageously to supply electrical power to the loads of electrified regulation systems of the turbine engines of the aircraft, and this in an optimum and secure manner.

The hybrid propulsion architecture proposed allows optimum use of power of the turbine-engine shafts for propulsion requirements, the taking off and injection of power on the shafts of the turbine engines for propulsion requirements, and sharing of taking off of power between the high-pressure and low-pressure shafts for non-propulsion requirements, while guaranteeing availability of functions and security of operation.

According to one embodiment, the present invention relates to an electrical architecture for a thermal/electrical hybrid propulsion aircraft, said aircraft including two turbine engines, said architecture comprising, for each turbine engine:
- an alternating-current AC aeroplane electrical network including a non-propulsion distribution network,
- at least one first electrical machine mechanically coupled to a high-pressure shaft of said turbine engine, said first electrical machine being configured to operate in motor mode in order to supply mechanical propulsion power and in generator mode to receive mechanical power and supply electrical power,
- at least one second electrical machine mechanically coupled to a low-pressure shaft of said turbine engine and configured in generator mode to receive mechanical power and supply electrical power, in particular at alternating current AC,
- a reversible AC/AC electrical energy conversion module arranged between at least one first network portion able to be coupled to the first electrical machine and at least one second network portion able to be coupled to the second electrical machine,
- switch elements,
- an electronic system controlling the conversion module and said switch elements, configured to put said architecture:
  - in at least one so-called "hybridisation by distribution of power" operating mode corresponding to a first configuration of the switch elements wherein said at least one second machine is coupled to the aeroplane network and at least one first machine is coupled to the aeroplane network via the electrical-energy conversion module.

In particular, the second machine can be coupled directly to the aeroplane network while the first machine is coupled to the aircraft network indirectly via the electrical-energy conversion module.

In this "hybridisation by power distribution" operating mode, the second machine thus supplies a first AC electrical power to said aeroplane network without intermediate converter and in particular without passing through said electrical-energy conversion module while said at least one first machine supplies a second AC electrical power via said electrical-energy conversion module.

A sharing of power for an AC network is thus implemented while limiting the number of elements, and in particular of converters necessary to do this.

The electronic system controlling the conversion module and said switch elements is typically provided with at least one motor-control unit.

Thus an AC supply by means of said at least one first machine connected to the high-pressure shaft and by said at least one second machine connected to the low-pressure shaft can be implemented.

An architecture according to the invention has the advantage of keeping an AC aeroplane network and making the hybridisation of the engine independent of the aeroplane network.

It also makes it possible to pool the power converter to implement the hybridisation scenarios.

Such an architecture can enable aircraft manufacturers to keep existing systems, for example of the ATA24 type and tried and tested mature electrical loads while benefiting from a turbomachine solution that has higher performance and is more economical in terms of fuel consumption.

Advantageously, in the "hybridisation by power distribution" operating mode, said at least one second machine supplies a first electrical power to said aeroplane network and said at least one first machine wherein the respective levels of said first power and of said second power being adjustable and controlled by the engine control unit.

It is thus possible to implement a power distribution between the LP and HP shafts under the control of the engine control unit according to its requirements for reduction of consumption, of operability margin or other constraints.

According to a possible implementation, the electronic control system can also be configured to put said architecture in at least one other operating mode referred to as "high-pressure shaft assistance" wherein said at least one second machine is coupled to said at least one first machine via the AC/AC electrical energy conversion module in order to supply electrical energy to said at least one first machine operating in motor mode. Thus the architecture can also allow transfer of energy from the low-pressure shaft to the high-pressure shaft.

According to a possible implementation, the architecture can further comprise at least one auxiliary AC electrical energy source, in particular able to be installed in a part of the body of the aircraft, the electronic control system also being configured to put said architecture in another operating mode referred to as "engine start-up" wherein the auxiliary electrical energy source is coupled to said at least one first electric machine by means of the AC/AC electrical energy conversion means, said at least one first machine operating in motor mode. Thus such an architecture is also compatible with electric starting of the turbine engine.

According to one implementation possibility, said at least one second electric machine can be formed by a regulator and a set of three stages mounted in cascade and coupled to the same low-pressure shaft of the turbine engine, said set being provided with:

a first stage provided with a three-phase generator with permanent magnets to supply a regulator by means of an alternating electric current at the output of the first stage, a second stage provided with a rotating-diode exciter in order, from a direct current obtained by rectifying said alternating electric current, to supply a rectified output current, a main stage provided with a three-phase synchronous machine supplied by said rectified output current, and to produce as an output a current with a frequency proportional to the rotation speed of the low-pressure shaft.

The AC/AC converter module makes it possible to size and operate said at least one first machine forming a high-speed motor-generator and to obtain optimisation of the mass of the machine and of its converter.

Advantageously, the AC/AC electrical energy conversion module is formed by a matrix AC/AC converter formed by a matrix of bidirectional switches and a cycloconverter.

According to one implementation possibility, the AC/AC electrical energy conversion module can be formed by a first reversible AC/DC converter and a second reversible AC/DC converter mounted in cascade and coupled to a set of motor loads of a DC propulsion electrical distribution network.

Advantageously, the architecture can also be configured to adopt an operating mode corresponding to a configuration of said switch elements so as to couple said at least one second electric machine and said at least one first electric machine to said motor loads of a propulsion electrical distribution network.

Thus, in addition to one of the operating modes defined above, it is possible to provide a connection of the first reversible AC/DC converter and of the second reversible AC/DC converter so as to allow a diversion of electrical power coming from said at least one first machine and from said at least one second machine to motor loads of the turbine engine. By offering a double source of electrical energy to the motor loads it is thus possible to improve the availability thereof.

According to one implementation possibility, the first AC/DC converter is directly connected to said a at least one first machine and incorporated in the same assembly as said at least one first machine, in particular the same casing.

According to another aspect, the present application aims to protect an aircraft with thermal/electrical hybrid propulsion comprising two turbine engines, each turbine engine comprising at least one high-pressure shaft and one low-pressure shaft, and, for each turbine engine, said aircraft comprises an electrical architecture as defined above.

BRIEF DESCRIPTION OF THE DRAWINGS

The present invention will be understood best and other details, features and advantages of the present invention will emerge more clearly from the reading of the description of a non-limitative example that follows, with reference to the accompanying drawings, on which:

FIGS. 3A to 3D show schematically various examples of implementation of a machine with permanent magnets incorporated in a stage of an electric machine coupled to a low-pressure shaft and incorporated in an architecture according to the present invention.

Identical, similar or equivalent parts of the various figures bear the same numerical references so as to facilitate passing from one figure to another.

The various parts shown on the figures are not necessarily shown to a uniform scale, to make the figures more legible.

DETAILED DESCRIPTION OF PARTICULAR EMBODIMENTS

Figure 1:
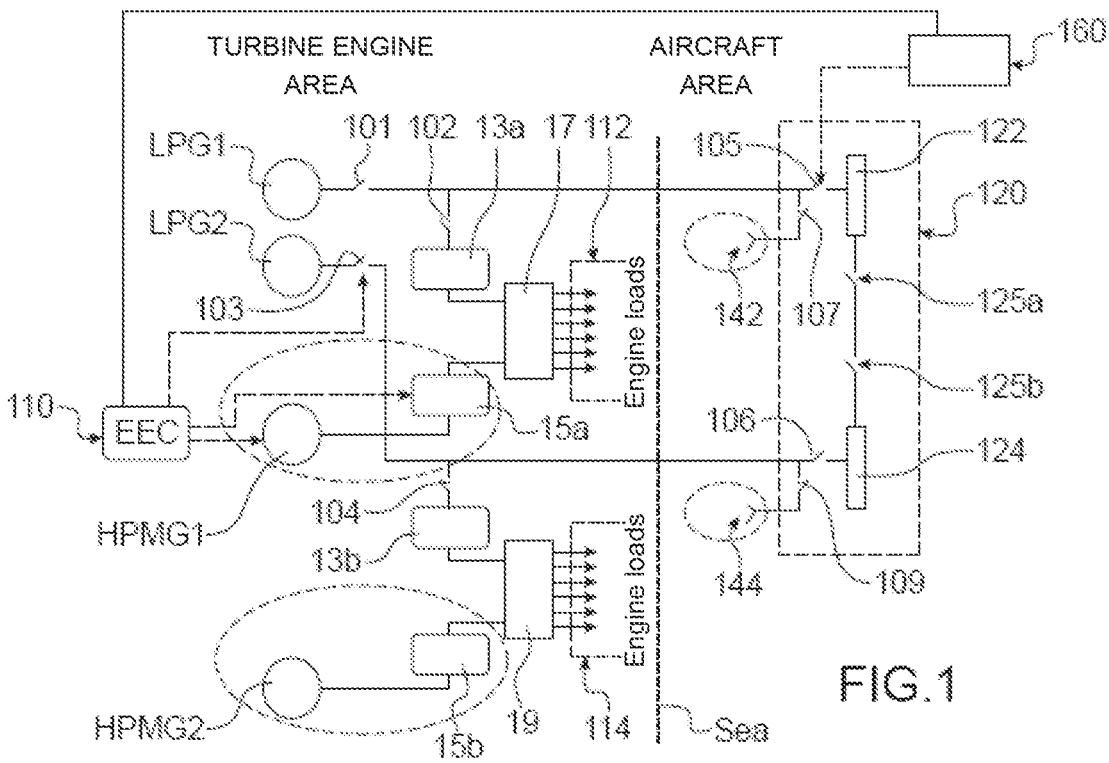
FIG. 1 shows schematically a first embodiment of electrical architecture for a thermal/electrical hybrid propulsion aircraft according to the invention making it possible to supply an AC network and to implement various scenarios of hybridisation of the turbine engine.

FIG. 1 shows a particular example embodiment of an electrical architecture according to the invention provided here for an aircraft of the twin-engine type with thermal/electrical hybrid propulsion.

The architecture includes a part associated with the turbine engine and a part associated with the aircraft, the broken line SEA representing the separation between the part of the architecture located in the turbine engine and the part of the architecture located in the body of the aircraft.

The architecture in FIG. 1 is described and depicted here for only one of the two turbine engines of the aircraft, but is composed of two almost symmetrical parts each associated with a turbine engine.

The electrical architecture here allows a supply of AC electrical energy to a so-called "aeroplane" network 120 from high-pressure HP and low-pressure LP shafts. The aeroplane network 120 is here an AC electrical network with a variable frequency of 360-800 Hz and with an effective voltage level for example of 115 V or 230 V. The aeroplane network 120 includes a first portion 122 and a second portion 124 that can be segregated from each other by means of switch element(s) 125a, 125b located between the two portions 122, 124. Each portion 122, 124 can incorporate a non-propulsion electrical distribution network intended to supply electricity to equipment related to the non-propulsion system and also referred to as "aeroplane loads".

The architecture is also connected, in this example embodiment, by means of an electrical distribution bus 17, 19, to a first set 112 and a second set 114 of loads referred to as "motor loads". These sets 112, 114 are typically supplied with high-voltage DC current (HVDC), for example operating at a voltage of the order of 540 V or 800 V.

In the example embodiment illustrated, the two sets 112, 114 of loads associated with one and the same turbine engine can be independent of each other and/or segregated from each other.

The architecture is in this example composed of channels symmetrical or almost symmetrical with each other. The architecture is thus provided with a plurality of electrical machines HPMG1, HPMG2 called "first electrical machine(s)" each mechanically coupled, by direct coupling or by means of a reduction box, i.e. of a gear system, to a high-pressure shaft of the same turbine engine.

Each first electrical machine HPMG1, HPMG2 is configured to operate in motor mode to supply mechanical propulsion power and in generator mode to receive mechanical power and supply electrical power. Each first electrical machine HPMG1, HPMG2 provides functions of injecting and taking off mechanical power dedicated to the propulsion requirements of the turbine engine, including the injection of power for starting, and injecting power for assistance of the high-pressure shaft constituting a parallel hybridisation of the turbine engine. The first electrical machines HPMG1, HPMG2 also fulfil functions of generating electrical power for the requirements of the aircraft and of the turbine engine.

Each first electrical machine HPMG1, HPMG2 is therefore an electrical source when it is operating in generator mode, and a load when it is operating in motor mode, and in particular when the turbine engine is started up. The first electrical machines HPMG1 and HPMG2 can for example be motor-generators, in particular with permanent magnets, coupled to the high-pressure (HP) shaft.

Each first electrical machine HPMG1, HPMG2 can be mechanically coupled to the high-pressure shaft in direct connection or in a variant by means of an accessory gearbox AGB. The accessory gearbox can be dedicated to the first electrical machines HPMG1, HPMG2. In particular, an angle transmission can be arranged between each first electrical machine HPMG1, HPMG2 and the high-pressure shaft.

The architecture also comprises a plurality of electrical machines LPG1, LPG2 mechanically coupled, by direct coupling or by means of a gearbox, to a low-pressure shaft of the turbine engine. These electrical machines, referred to as "second machines" LPG1 and LPG2, fulfil functions of taking off mechanical power dedicated to the propulsion requirement. They are here configured to operate in generator mode to receive mechanical power and accordingly supply electrical power, in particular in the form of an AC signal. The second electrical machines LPG1 and LPG2 fulfil functions of generating electrical power for the requirements of the aircraft and of the turbine engine. The second electric machines LPG1 and LPG2 are advantageously alternating-current generators, in particular of the 3-stage type coupled to the low-pressure (LP) shaft, and a more detailed example embodiment of which will be provided below.

In this example embodiment, each first electric machine HPMG1, HPMG2 is connected to a reversible AC/DC converter 15a, 15b. The converters 15a, 15b here make it possible in particular to adapt the electrical power supplied in the form of alternating voltage or alternating current by the first machine HPMG1, HPMG2 at the voltage of the propulsion electrical distribution network, typically of the HVDC type, and to regulate this voltage at a predetermined value. This value can be of the order of plus or minus a few percents of the nominal voltage value $U_{nom}$, for example between −1 or −2% of $U_{nom}$, and +1%+2% of the nominal voltage $U_{nom}$, with $U_{nom}$ that may for example be of the order of 540 V or 800 V.

Each second electric machine LPG1, LPG2 is here also able to be connected to a first reversible AC/DC converter 13a, 13b. The converters 13a, 13b also make it possible, in this example embodiment, in particular to adapt an electrical power coming from the second machine LPG1, LPG2 in the form of an alternating voltage or alternating current at the voltage of the propulsion electrical distribution network.

Apart from a distribution of power HDVC to one or more sets of motor loads, the architecture is configured to supply an AC electrical energy to the aeroplane network 120.

For this purpose, in a first channel, the second machine LPG1 connected to the low-pressure shaft is able to be coupled directly to the first portion 122 of the aeroplane network 120. Thus the second machine LPG1 can supply an AC electrical power directly to the first portion 122 of the aeroplane network 120 without intermediate converter, and in particular without passing through the succession of AC/DC converters 13a, 15a.

In this first channel, the first machine HPMG1 connected to the high-pressure shaft can be coupled to the first portion 122 of the aeroplane network 120 via the succession of reversible AC/DC converters 15a, 13a, which then forms a reversible AC/AC converter. There is thus an indirect coupling between the first machine HPMG1 and the first portion 122 of the aeroplane network 120.

In a second channel, the other second machine LPG2 connected to the low-pressure shaft can be coupled directly to the second portion 124 of the aeroplane network 120. Thus the machine LPG2 can supply an electrical power AC to the second portion 124 of the aeroplane network 120 without intermediate converter, and in particular without passing through the succession of AC/DC converters 13b, 15b.

In this second channel, the other first machine HPMG2 connected to the high-pressure shaft is able to be coupled to the second portion 124 of the aeroplane network 120 via the succession of reversible AC/DC converters 15b, 13b, which then forms another reversible AC/AC converter. There is thus an indirect coupling between the machine HPMG2 and the second portion 124 of the aeroplane network 120.

The architecture is also provided with switch elements 101, 102, 103, 104, 105, 106, 107, 109 to alternately disconnect and connect together certain network portions. The on (closed) or off (open) state of the switch elements is controlled by an electronic control system.

The switch elements 101, 102, 103, 104 in the turbine engine part can be controlled by means of an electronic control unit 110 of this system, typically an engine control unit EEC (standing for "electronic engine controller") or FADEC (standing for "full authority digital engine control") or a dedicated computer of the engine network (not shown on the figures).

The electronic control unit 110 can be provided with a hardware architecture of a computer and typically comprises a processor, a non-volatile memory, a volatile memory and an interface. The processor makes it possible to execute computer programs stored in the non-volatile memory, using the volatile memory. The interface makes it possible to acquire signals representing the operation of the turbine engine and to send control signals. The electronic control unit 110 can comprise a computer or be associated and communicate with another computer at the engine.

The switch elements 105, 106, 107, 109 arranged in the aeroplane part can for their part be controlled by means of one or more so-called "aeroplane" computers 160, typically distinct from that or those of the turbine engine part. In order not to overload the figure, only the command of the switch 105 is illustrated on

FIG. 1.

In the electronic control system, the control unit 110 can be connected in a network with the aeroplane computer or computers 160.

The switch elements 101, 102, 103, 104, 105, 106, 107, 109 can for example be in the form of electromechanical devices such as contactors. These contactors can also allow isolation of parts of the architecture, for example of faulty parts.

The electrical architecture is able to adopt various operating modes corresponding to various respective configurations and states of switch elements with which it is associated.

The electrical architecture thus has the particularity of being able to adopt a first so-called "hybridisation by power balancing" operating mode corresponding, in the first channel, to a first configuration of the switch elements 101, 105, 102 here put in an on (i.e. closed) state to enable the second machine LPG1 to be coupled to the portion 122 of the aeroplane network 120 and to supply electrical power to it and to enable the succession of converters 15a, 13a to be coupled to the portion 122 of the aeroplane network 120 in also order to supply to it electrical power coming from the first machine HPMG1.

Likewise, in the second channel, in this example of an arrangement similar to the first, the machine LPG2 can be coupled to the aeroplane network 120 in order to supply AC electrical power to the aeroplane network 120. For this purpose, a switch element 103 located between an output of the second machine LPG2 and the aeroplane network 120 is put in an on (i.e. closed) state, while another switch element 106 located between the switch element 103 and the aeroplane network 120 is also put in an on (i.e. closed) state. The machine HPG2 is indirectly coupled to the aeroplane network 120 in order to supply AC electrical power to the network 120 via the succession of converters 15b, 13b. For this purpose, a switch element 104 located between the aeroplane network 120 and the succession of reversible AC/DC converters 13b, 15b is put in a closed state.

In this operating mode, two reversible AC/DC static converters 13a and 15a (and respectively 13b and 15b) inserted in cascade between each generation channel associated with the high-pressure shaft and with the low-pressure shaft form an AC/AC converter to produce an AC power intended for the aeroplane network 120.

In the operating mode of hybridisation by power balancing between the HP and LP shafts, the AC/AC converter 13a-15a is synchronised on the aeroplane network side 120 on the frequency of the second machine LPG1 and allows distribution of the power supply between the high-pressure and low-pressure shafts on instruction from the EEC control unit 110.

Such a mode can operate in two phases, a phase of coupling (or putting in parallel) the two machines LPG1 and HPG1 (and respectively LPG2 and HPG2) where the converter 13a (and respectively 13b) generates a voltage synchronised in amplitude and in frequency with the voltage of the second machine LPG1 (and respectively LPG2) to enable the two generators to be put in parallel by closing the switch element 102 (and respectively 104). Next, in generation mode with power balancing, the instructions to the second machine LPG1 and the converter 13a (and respectively LPG2 and converter 13b) are adjusted to distribute the takeoffs of power between the two high-pressure and low-pressure shafts. In the two cases, the output frequency of the DC/AC converter 13a (and respectively 13b) is preferably identical to the frequency of the second machine LPG1 (and respectively LPG2).

The EEC control unit 110 makes it possible to modulate the powers supplied respectively by the first machine HPMG1 (and respectively HPMG2) and by the second machine LPG1 (and respectively LPG2), and to control the proportion delivered by each of said first machine HPMG1 (and respectively HPMG2) and second machine LPG1 (and respectively LPG2), in particular to the aeroplane network 120. The total power taken off can also be distributed to supply the aeroplane loads and the motor loads between the HP and LP shafts.

Depending on the operating point of the turbine engine, the EEC control unit 110 can generate instruction signals (an instruction signal represented for example on FIG. 1 by an arrow from EEC to HPMG1) to distribute power to the controllers of the generators of the turbine engine for requirements to reduce fuel consumption or to improve its operability margins.

Several ways can be envisaged to achieve this distribution: either a distribution of the total power by percentage between the two generators or a limitation of the taking off on one shaft to force taking off on the other shaft. The generators being regulated for voltage at the regulation point of the electrical network, when taking off on one generator is limited, the second generator compensates for the proportion of the missing current to maintain the voltage at the regulation point.

The power distribution is adjusted according to the requirements of the turbine engine. The total power taken off is here distributed to supply the aeroplane loads located in the aeroplane network 120 and the motor loads 112, 114 between the HP and LP shafts.

In this hybridisation by power balancing operating mode, the first converter 15a (and respectively 15b) at the output of the first machine HPMG1 fulfils the function of an active AC/DC rectifier converting an alternating current or an alternating voltage at the output of the first machine HPMG1 into a direct current or voltage. The second converter 13a (and respectively 13b) for its part fulfils the function of a DC/AC inverter converting direct current/voltage coming from the first converter 15a (and respectively 15b) into alternating current and current/voltage with the same electrical signal frequency as the electrical signal coming from the second machine LPG1 (and respectively LPG2). The amplitude of the electrical signal coming from the first converter 15a (and respectively 15b), apart from the coupling sequence, is adjustable according to the power balancing requirements as described above.

Another type of hybridisation is possible with the architecture illustrated on FIG. 1. Thus, according to another so-called "power-sharing assistance" operating mode, the second machine #LPG1 (and respectively LPG2) is coupled to the first machine HPMG1 (and respectively HPMG2) via the succession of converters 13a, then 15a (and respectively 13b and then 15b) of the electrical energy conversion module in order to supply electrical power to said first machine HPMG1 (and respectively HPMG2) then operating in motor mode A transfer of electrical energy from a second machine LPG1 (and respectively LPG2) associated with the low-pressure shaft to a first electrical machine HPMG1 (and respectively HPMG2) associated with the high-pressure shaft can be made in order to implement assistance of the high-pressure shaft from the low-pressure shaft.

In this operating mode, the second converter 13a (and respectively 13b) forms an AC/DC rectifier and has the function of rectifying an alternating current or voltage coming from the second machine LPG1 (and respectively LPG2). The first converter 15a (and respectively 15b) for its part forms a DC/AC inverter converting direct current/ voltage coming from the second converter 13a (and respectively 13b) into alternating current and current/voltage.

The architecture also comprises in this example, for each channel, an AC auxiliary energy source 142, 144 in order to have available an additional source capable of supplying energy to the propulsion and/or non-propulsion network. As shown on FIG. 1, the auxiliary energy source 142, 144 can be arranged in the aircraft part of the architecture and therefore be located in the body of the aircraft. The AC auxiliary energy source 142, 144 can the connected to or isolated from the rest of the architecture according to the state (respectively closed or open) of a switch element 107, 109.

The auxiliary energy source 142, 144 can be coupled to the propulsion electrical distribution network and configured to supply energy to the first machine HPMG1, HPMG2 when the latter is operating in motor mode and to supply the propulsion electrical distribution network when the electrical machines are not available. The auxiliary energy source 142, 144 can be used for energy-optimisation or sizing purposes. The auxiliary energy source 142, 144 can comprise an auxiliary electrical machine APU ("auxiliary power unit") provided with an electricity generator typically of the alternator type.

In a variant or in combination with the auxiliary energy sources 142, 144 illustrated, a fleet unit disposed on the ground can also serve as an auxiliary supply and make it possible to effect an engine start-up on the ground while supplying the aeroplane and motor loads.

The auxiliary energy source can also be an electrical supply obtained from the other generator or generators of the other turbine engine. Such a supply then makes it possible to effect a cross-start in which one engine is started from the opposite engine.

According to one particular operating mode, the control system can put the architecture in another configuration of the switch elements in which the auxiliary electrical energy source 142 (and respectively 144) is coupled to the first electrical machine HPMG1 (and respectively HPMG2) by means of the succession of AC/DC and reversible AC/DC converters 13a, 15a (and respectively 13b, 15b) and forming an AC/AC converter. The first machine HPMG1, HPMG2 then operates in motor mode. Such an operating mode is in particular used to implement an engine start from an aeroplane source. In such an operating mode, the switch elements 107, 103 (and respectively 109, 104) are closed to allow such coupling. In engine start mode, on the ground or in flight, the second machine LPG1 (and respectively LPG2) is disconnected by opening the switch elements 101, 103. The aeroplane and motor loads for their part can remain connected.

In this operating mode, the second converter 13a (and respectively 13b) forms an AC/DC rectifier and has the function of rectifying an alternating current or voltage coming from the auxiliary electrical energy source 142 (and respectively 144). The first converter 15a (and respectively 15b) for its part forms a DC/AC inverter converting direct current/voltage coming from the second converter 13a (and respectively 13b) into alternating current and current/voltage.

In all the operating modes described, the reversible AC/DC converters 13a, 15a, 13b, 15b are interconnected so as also to be able to allow a diversion of power on an HVDC intermediate bus 17, 19 to loads of the turbine engine. A double source to the motor loads is thus offered, thereby improving the availability thereof.

The EEC control unit 110 is a computer that manages the operation of the turbine engine and decides on hybridisation scenarios and offers of power to be taken from each HP and LP shaft. For this purpose it sends electronic instruction signals to the power converters 13a-15a, 13b-15b that are responsible for managing the proportion of powers to be transferred between each of the low-pressure and high-pressure parts. The converters 13a-15a, 13b-15b as indicated above can be provided with their own close control cards. The management of the electrical network and switch elements (contactors) is in the example embodiment illustrated on FIG. 1 implemented by the EEC control unit 110. In this case the EEC control unit 110 hosts additional functions of managing the motor network.

Figure 15:
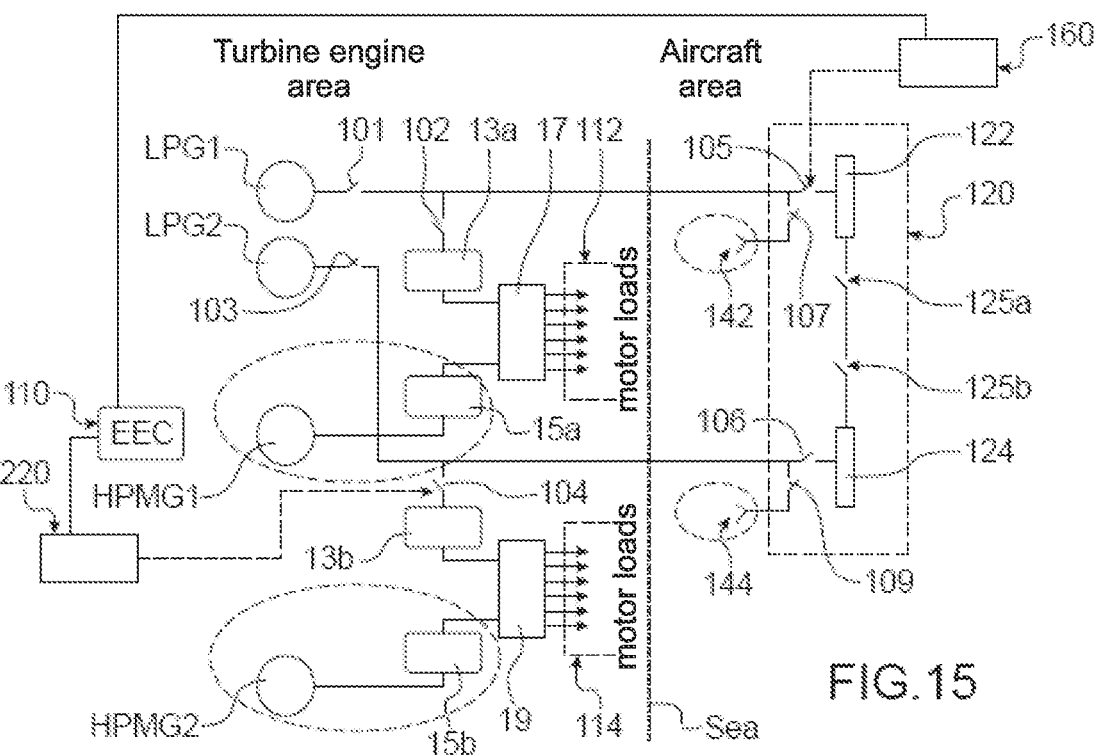
FIG. 15 shows a variant electrical architecture illustrated on FIG. 1.

According to a variant shown on FIG. 15, it is also possible to implement this control of the contactors, in particular of the switch elements 101, 102, 103, 104, by means of another control unit 220 distinct from the control unit 110, but which communicates and exchanges electronic control signals with the latter. The control unit 220 can be provided with a hardware architecture similar to or repeating elements of the control unit 110. The control unit 220 is typically provided with a processor, a non-volatile memory, a volatile memory and an interface.

This distinct control unit 220 can also be designed to manage the whole of the propulsion electrical system in coordination with the EEC control unit 110. The control unit 220 would then be in interface with the EEC 110 and the unit 160 firstly to exchange information and the command instructions, and secondly with the converters 13a, 13b, 15a, 15b and all the switches of the propulsion system to provide control-command thereof.

This principle is applicable to the embodiments in FIGS. 1, 10, 11, 12, 13, 14 and 15.

Figure 2:
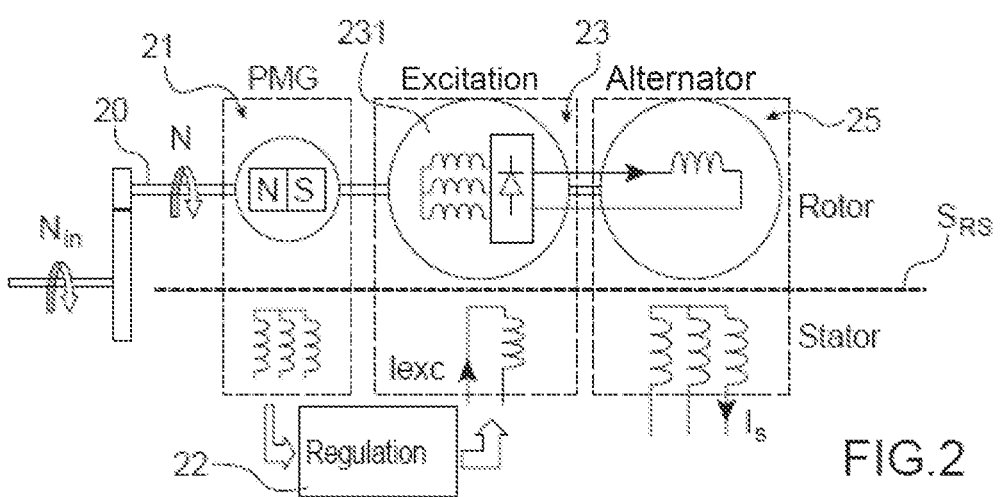
FIG. 2 shows schematically various stages of an electric machine coupled to a low-pressure shaft and able to be incorporated in an electrical architecture according to the present invention.

The second electrical machine LPG1, LPG2 coupled to the low-pressure shaft can, as in the example embodiment illustrated on FIG. 2, be a three-stage synchronous machine 21, 23, 25, incorporating a generator control unit or GCU 22. Such a unit is typically provided with a voltage regulator and a set of analogue and/or logic control and protection electronic circuits. The control unit 22 typically forms part of the control unit 160 of FIG. 1 in the aeroplane zone.

These stages 21, 23, 25 are typically mounted in cascade on the same low-pressure LP mechanical shaft 20. A broken line SRs delimits the respective rotor parts of the stages 21, 22, 23, and the respective stator parts of the same stages 21, 22, 23 shown schematically.

A first stage 21 is provided with a generator of the PMG ("permanent magnet generator") type, typically three-phase and which supplies the regulation unit 22 by means of an alternating electric current.

A second stage 23 juxtaposed with the first stage is for its part provided with a reversed three-phase synchronous generator serving as exciter.

The fixed DC current of the exciter part of this second stage 23 is produced at the output of the regulation unit 22 in the form of a DC current $I_{exc}$ by rectifying an AC current supplied by the PMG generator. A main winding 231 of the second stage is located on the rotating part and supplies a current rectified by rotating diodes 233 mounted on the same shaft 20. The diodes 233 are connected at the output to an exciter part of a third stage 25, also referred to as "main stage".

The third stage 25 juxtaposed with the second stage fulfils a function of alternator and is in the form of a three-phase synchronous machine with wound rotor. Its rotor part is supplied by the second stage 23 with direct current Ir. The main winding mounted on its stator part is three-phase and connected to a network portion to be supplied with alternating current. The frequency of the current Is supplied at the output of the first machine LPG1, LPG2 is proportional to the rotation speed of the low-pressure shaft.

On the other hand, with regard to the rotor of the permanent-magnet machine, it is provided with permanent magnets arranged so as to reproduce a rotating field in the air gap.

Various arrangements of the machines HPMG1 (and respectively HPMG2) are possible, as shown on FIGS. 3a-3d.

According to a first possibility of implementation (FIG. 3A) with contiguous magnets and radial magnetisation, the rotor is provided with magnets, in this particular example implementation with four magnets 31, 32, 33, 34, placed against each other and disposed along a circular-shaped contour, the magnets 31, 32, 33, 34 each having a radial magnetisation and respective magnetizations in opposite directions between a given magnet and its neighbours against which this given magnet is placed. The magnets 31, 32, 33, 34 can be distributed around a cylindrical field-winding yoke 30 arranged around an armature 36.

A second possibility of implementation (FIG. 3B) provides a rotor provided, as in the previous example, with an arrangement of the magnets 31, 32, 33, 34 that differs from the previous example in that this time they are separated in pairs by a given space and/or a non-magnetic material.

A third possibility of implementation, this time with tangential magnetisation, can be provided for. As illustrated on FIG. 3C, the rotor can in this case be provided with magnets 31', 32', 33', 34' having an arrangement similar to the above, but with respective magnetisation is in a direction tangential with respect to the circular-shaped contour around which they are distributed.

Figure 3D:
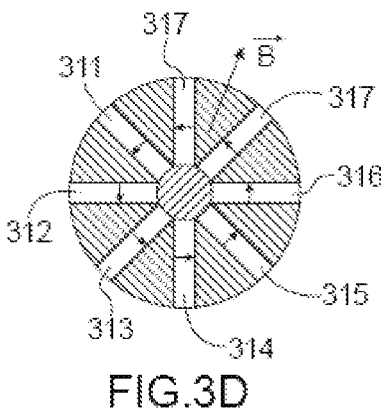

A fourth possibility of implementation referred to as "flux concentration" is illustrated on FIG. 3D. It provides magnets 311, 312, 313, 315, 316, 317, 318 separated in pairs by a pole piece and regularly distributed around and against the armature. The magnets 311, 312, 313, 315, 316, 317, 318 extend radially while having magnetisation in a tangential direction.

For the first machines HPMG1 and HPMG2 of the arrangement with two channels described above in relation to FIG. 1, various configurations can be provided in order to obtain two equivalent electrical supplies to two machines connected to the high-pressure HP shaft. In particular, as shown on FIGS. 4 to 8, various configurations are possible depending on the degree of segregation required.

Figure 4:
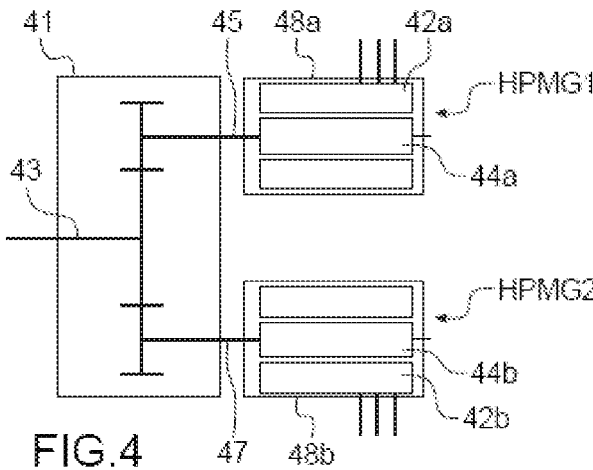
FIGS. 4 to 8 show schematically various embodiments of first electric machines each coupled to a low-pressure shaft.

FIG. 4 gives a first configuration with complete segregation of the electrical machines. The electrical machines HPMG1, HPMG2 are mechanically coupled to the high-pressure shaft by means of an accessory box 41. The mechanical input 43 of the accessory box 41 is intended to be coupled to the high-pressure shaft. A first mechanical output 45 of the accessory box 41 is coupled to the first electrical machine HPMG1, and a second mechanical output 47 of the accessory box 41 is coupled to the other electrical machine HPMG2. Each electrical machine HPMG1, HPMG2 includes a stator 42a, 42b, a rotor 44a, 44b, and a casing 48a, 48b that is particular to it. The electrical machines HPMG1, HPMG2 are segregated from each other on the accessory box 41. The electrical machines HPMG1, HPMG2 can thus have a rotation speed different from the rotation speed of the high-pressure shaft and in a multiplication ratio defined by the accessory box. The two machines can rotate at the same speed but in opposite rotation directions imposed by the accessory box.

Figure 5:
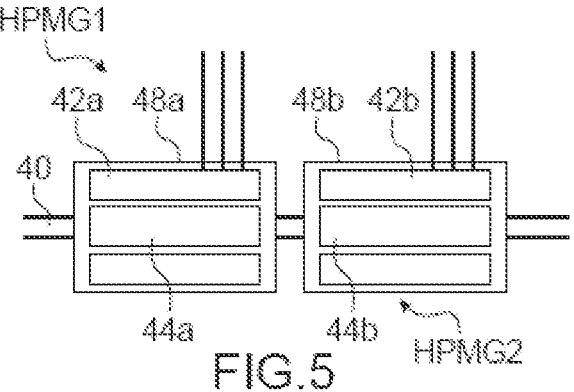

A second configuration, illustrated on FIG. 5, this time provides the electrical machines HPMG1, HPMG2 mechanically coupled to the high-pressure shaft 40 in direct connection. The electrical machines HPMG1, HPMG2 thus rotate at the same speed as the high-pressure shaft. Each electrical machine HPMG1, HPMG2 is provided with a stator 42a, 42b, a rotor 44a, 44b and a casing 48a, 48b that is particular to it.

Figure 6:
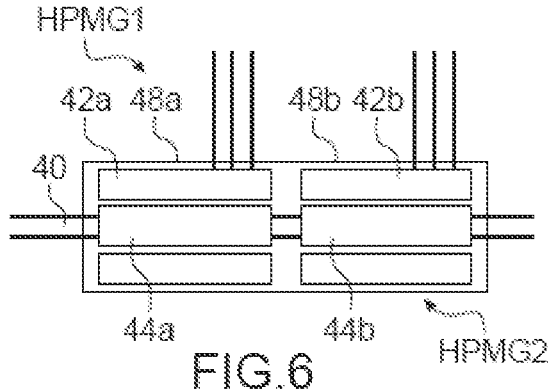

A third configuration illustrated on FIG. 6 shows the electrical machines HPMG1, HPMG2 mechanically coupled to the high-pressure shaft 40 in direct connection. Each electrical machine HPMG1, HPMG2 includes a stator 42a, 42b and a rotor 44a, 44b that is particular to it, and a casing 48 that is common to the two electrical machines. The electrical machines HPMG1 HPMG2 are segregated from each other, internally, by means of magnetic and electrical circuits (not shown).

Figure 7:
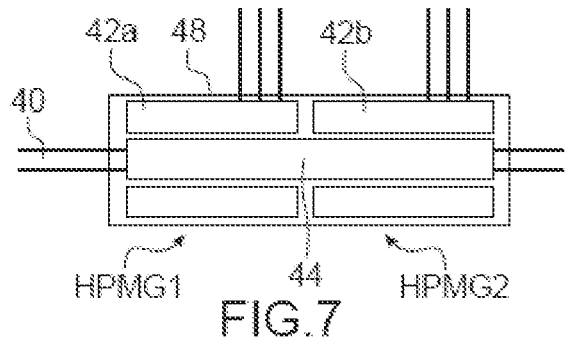

FIG. 7 this time gives a configuration of the electrical machines HPMG1, HPMG2 mechanically coupled to the high-pressure shaft 40 in direct connection and a casing 48 that is common to the two electrical machines. Each electrical machine HPMG1, HPMG2 includes a stator 42a, 42b that is particular to it, and a rotor 44, as well as a common magnetic rotor circuit. The electrical machines HPMG1, HPMG2 our segregated from each other magnetically and electrically on the stators 42a, 42b.

Figure 8:
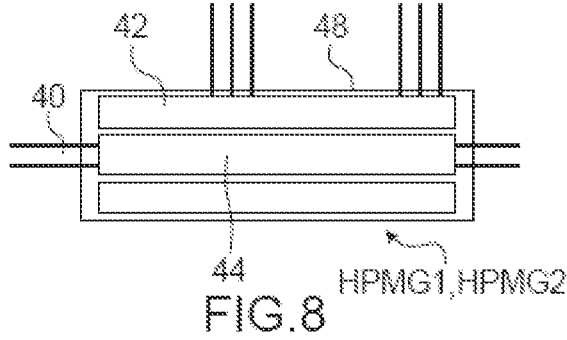

Another configuration is given on FIG. 8 with, there also, the electrical machines HPMG1, HPMG2 mechanically coupled to the high-pressure shaft 40 in direct connection. The electrical machines HPMG1, HPMG2 include a stator 42, a rotor 44 and a casing 48, which are common to the two electrical machines, as well as a common stator and rotor magnetic circuit (not shown). The electrical machines HPMG1, HPMG2 are segregated from each other electrically on the stator 42.

Likewise, for the machines LPG1 and LPG2, various configurations can be provided.

Figure 16:
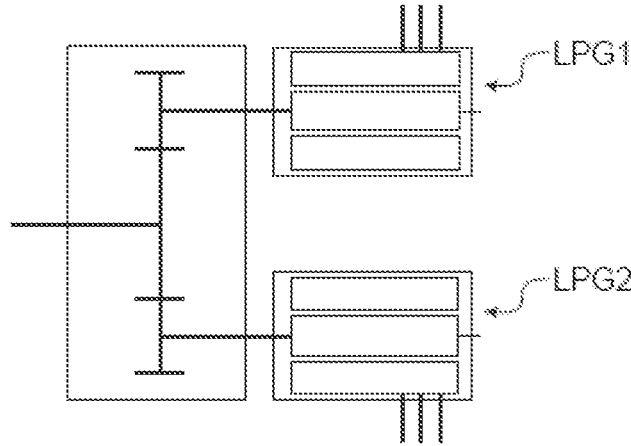
FIGS. 16 to 18 shows schematically various embodiments of second electrical machines each coupled to a low-pressure shaft.

FIG. 16 gives a first configuration with complete segregation of the electrical machines LPG1, LPG2.

Figure 17:
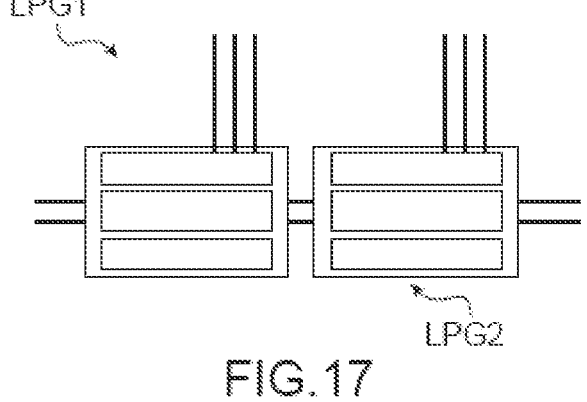

A second configuration illustrated on FIG. 17 this time provides the electrical machines LPG1, LPG2 mechanically coupled to the low-pressure shaft in direct connection.

Figure 18:
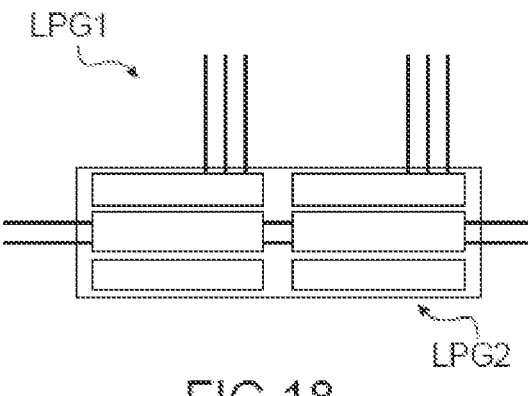

A third configuration illustrated on FIG. 18 shows the electrical machines LPG1, LPG2 mechanically coupled to the low-pressure shaft in direct connection, each electrical machine LPG1, LPG2 including a stator and a rotor that is particular to it, and a casing that is common to the two electrical machines.

In the example architecture described previously in relation to FIG. 1, each first machine HPMG1 (and respectively HPMG2) is associated with an AC/DC static converter 15a (and respectively 15b) that is located at the output of the first machine HPMG1, HPMG2. A first machine HPMG1, HPMG2 and its associated converter can be separated so as each to be located in distinct boxes. In a variant, provision can be made, as in the example illustrated on FIG. 14, for incorporating the first machine HPMG1 and its associated reversible AC/DC converter in one and the same assembly 150a (and respectively 150b) called a "smart machine", the generator and the converter then typically been located in one and the same casing. Such integration makes it possible to optimise the mass and space requirement since it is possible optionally to dispense with some cables, an EMC ("electromagnetic compatibility") filtering, and a cooling circuit.

As indicated previously, the reversible AC/DC converters 13a and 15a or 13b and 15b put in cascade can be replaced by a single AC/AC converter, in particular a cycloconverter or a matrix AC/AC converter.

Figure 9:
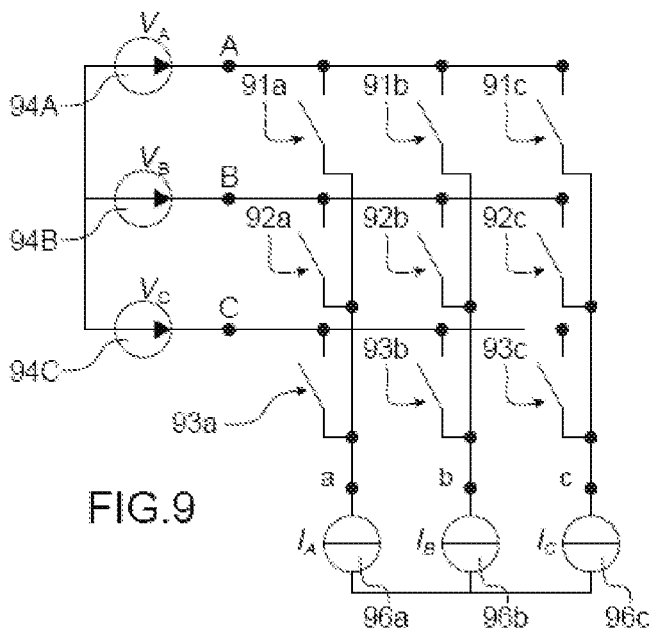
FIG. 9 shows schematically an example of a reversible AC/AC converter with matrix arrangement and able to be incorporated in an electrical architecture according to the invention.
Figure 10:
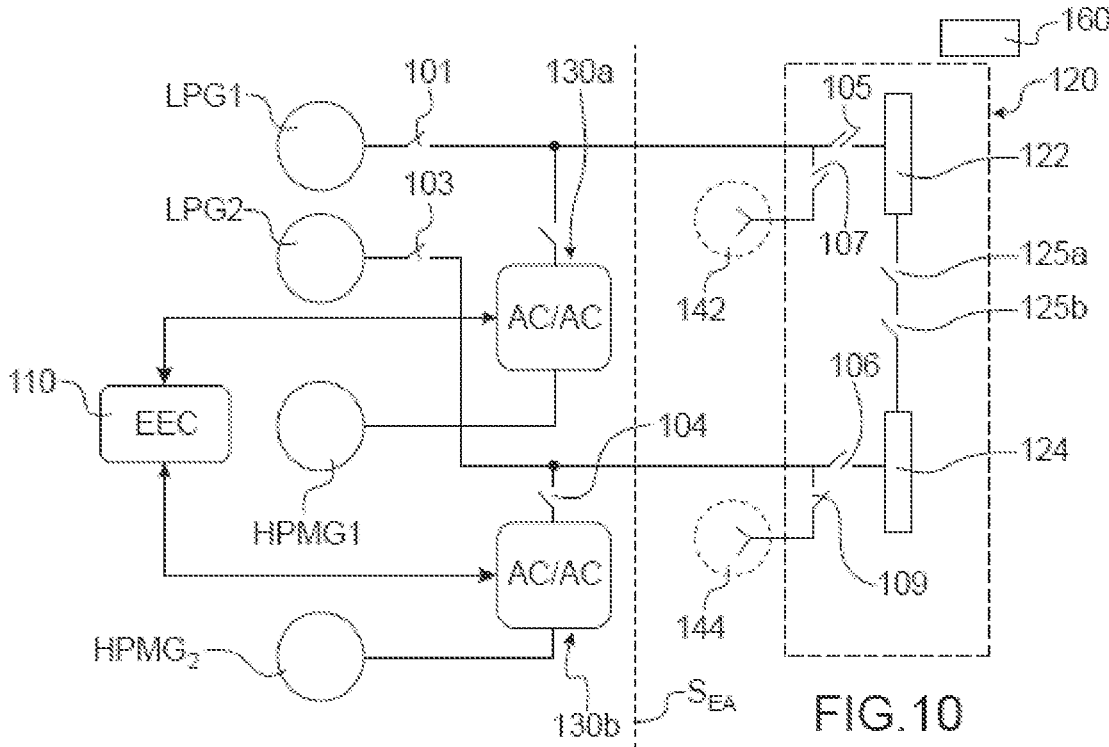
FIG. 10 shows schematically an electrical architecture according to a second embodiment of the present invention.

An example of an equivalent electrical diagram of a matrix converter is given on FIG. 9, the converter being provided here with a 3*3 matrix of bidirectional switches 91a, 91b, 91c, 91d, 92a, 92b, 92c, 93a, 93b, 93c, for example of the IGBT transistor type, between voltage sources 94A, 94B, 94C and current sources 96A, 96B, 96C.

A variant embodiment of the electrical architecture described above is given on FIG. 10.

For this variant, the distribution of electrical power to motor loads is omitted. Such an architecture is thus adapted for example to a turbine engine without electrification of motor loads located at the turbine engine. The two successive reversible AC/DC and DC/AC converters are here replaced by a reversible AC/AC converter 130a, 130b, which may be of the matrix type and for example such as the one described previously in relation to FIG. 9. The respective states of the bidirectional switches of the converter can be controlled by the EEC control unit 110.

In this architecture as in the others, the converters are typically provided with its own control module, typically provided with at least one electronic card, and which is able to exchange signals with the EEC control unit 110 on another intermediate computer at the motor.

The functionalities offered by this architecture are similar to those of the architecture of FIG. 1, except therefore for the HVDC supply of the motor loads.

This variant architecture can thus also make it possible to supply the AC aeroplane network 120 via a second machine LPG1, LPG2 associated with the low-pressure shaft and/or via a first machine HPMG1, HPMG2 associated with the high-pressure shaft, in a proportion controlled by the EEC control unit 110 of the respective powers supplied by these machines LPG1, HPMG1 (and respectively HPMG2, LPG2).

Here, as in the example embodiment described previously, the control unit 110 can be provided with at least two segregated channels to exchange signals with the converters. Such a redundancy principle can also apply to the unit 220 illustrated on FIG. 15.

This variant architecture can also make it possible to supply the propulsion network by means of an alternative electrical energy coming from auxiliary energy sources 142 and 144 and in particular to effect a starting of the turbine engine using this electrical energy transmitted to the first machines HPMG1, HPMG2 then operating in motor mode.

A motor start-up can then be achieved by means of the two channels via the machines HPMG1 and HPMG2 simultaneously or in a variant by means of a single channel via the machines HPMG1 or HPMG2, in particular in the case of breakdown of the other channel.

For this variant, as for the example embodiment described previously, it is possible to have the first machine HPMG1 (and respectively HPMG2) and its reversible AC/AC converter 130a (and respectively 130b) associated in one and the same assembly 150a (and respectively 150b) of the "smart machine" type.

Figure 11:
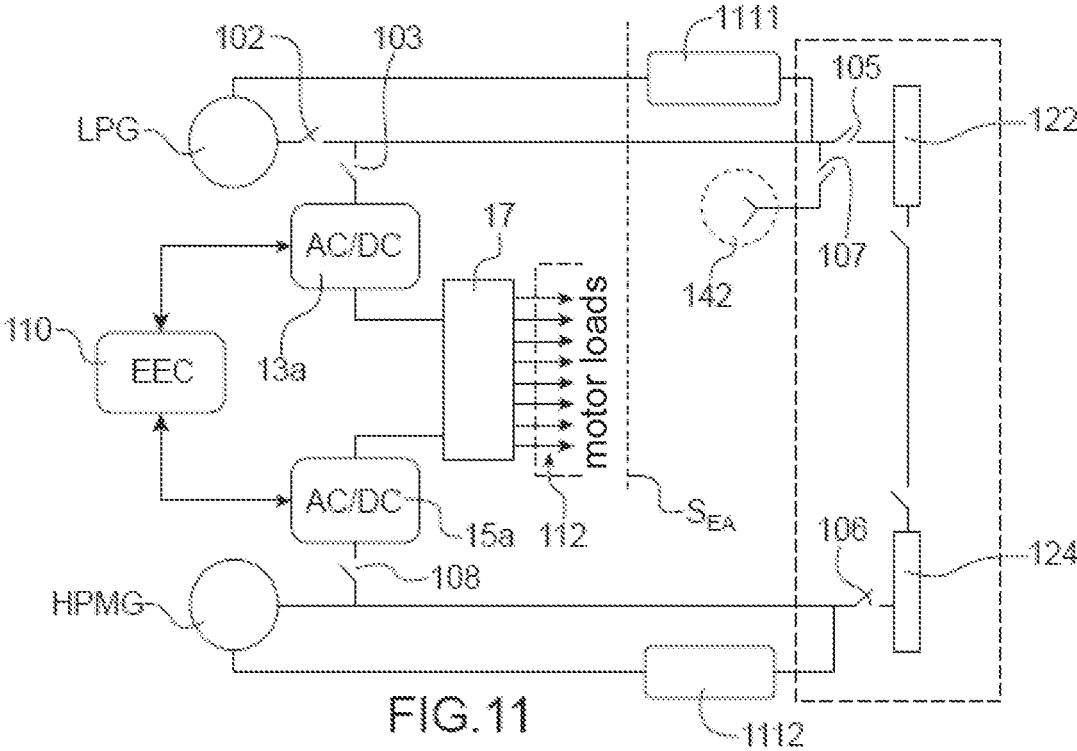
FIG. 11 shows schematically an electrical architecture according to a third embodiment of the present invention.

Another variant with a single channel is given on FIG. 11 and is provided this time with an electrical machine LPG of the same type as the second machines of one or other of the examples given previously and which is mounted on the low-pressure shaft. This electrical machine LPG is associated with a control unit 1111, formed by one or more electronic circuits, which is here located in the body of the aircraft.

The architecture is provided with a machine HPMG mounted on the high-pressure shaft and which can be in the form of a 3-stage machine as described previously to provide an AC supply at the controlled voltage. This electrical machine HPMG is associated with an independent control unit 1112, formed by one or more electronic circuits, which is here located in the body of the aircraft.

Thus, in this example embodiment, the machines HPMG and LPG can each be a three-stage machine making it possible in particular to effect a motor start from an aeroplane source.

The functionalities offered by this variant are, there also:

a balancing of electrical power between the one supplied by the electrical machine LPG associated with the low-pressure shaft and the one supplied by the electrical machine HPMG associated with the high-pressure shaft, an aid to starting the turbine engine by means of an external source 142 supplying electrical power to the machine HPMG, which then operates in motor mode.

a DC supply of electricity at high voltage for a set 112 of motor loads.

Here, as in the example embodiment illustrated on FIG. 1, a set of AC/DC converters 13a and DC/AC converters 15a arranged in cascade form an AC/AC converter disposed between the machine LPG associated with the low-pressure shaft and the machine HPMG associated with the high-pressure shaft. The arrangement of this architecture differs however here in particular in that the machine HPMG associated with the high-pressure shaft can be isolated from the AC/AC converter module by means of a switch element 108 arranged between the machine HPMG and the AC/DC converter 15a.

Switch elements 102, 108 are thus provided on either side of the AC/AC converter and, when they are open, make it possible to isolate the converter from the rest of the architecture. In this case, when the switch elements 102, 105 are on, the second machine LPG is able to supply electrical energy to a portion 122 of the aeroplane network 120 without sharing power with the first machine. Likewise, when the switch element 106 is on, the first machine HPMG is able to supply electrical energy to a portion 124 of the aeroplane network 120 without sharing power with the second machine.

The machine HPMG can also directly supply electrical power to a portion 124 of the network 120, without intermediate converter.

Figure 12:
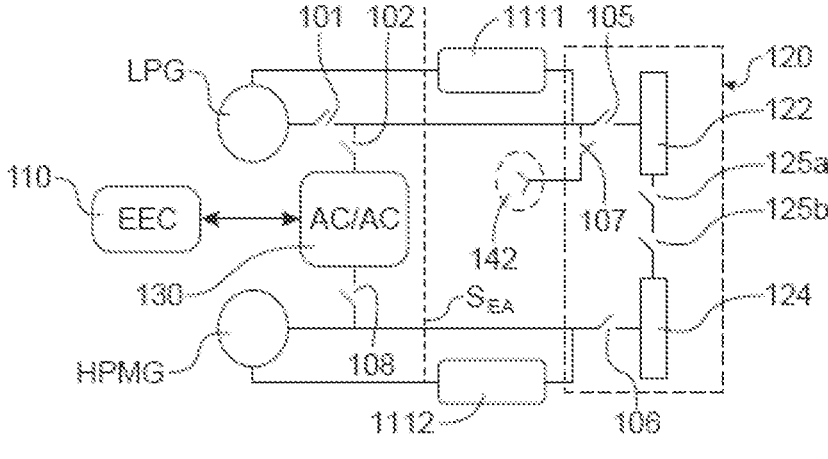
FIG. 12 shows schematically an electrical architecture according to a fourth embodiment of the present invention.

Another variant, illustrated on FIG. 12, differs from the previous one in that a distribution to the motor loads is omitted. Such a variant is adapted in particular to a turbine engine without electrification of domestic motor loads.

The machine HPMG associated with the HP shaft can be, as in the previous example embodiment, a 3-stage machine to provide a controlled AC voltage supply. An AC/AC converter 130 can be in the form of 2 successive AC/DC and DC/AC converters or a single direct converter, for example of the matrix or cycloconverter type.

The operating modes in which a hybridisation by power balancing between the electrical power supplied by the machine LPG associated with the LP shaft and the machine HPMG associated with the HP shaft is also possible as well as an operating mode in which an auxiliary source allows motor start-up.

Figure 13:
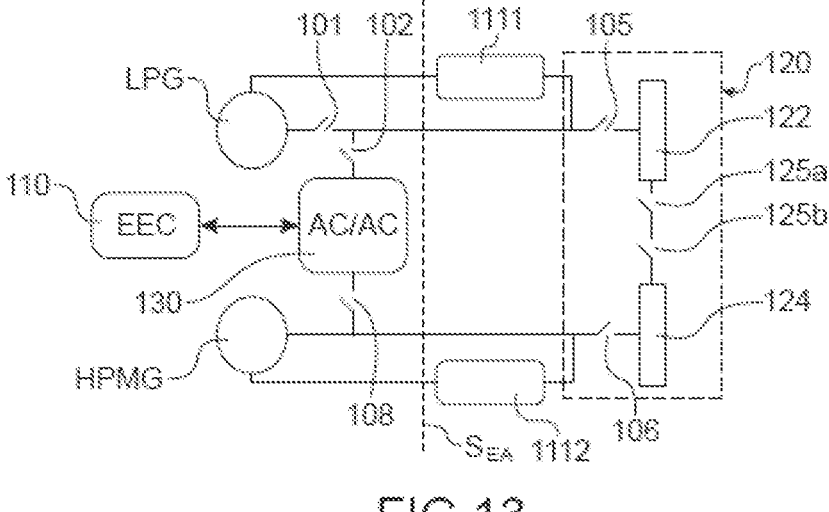
FIG. 13 shows schematically an electrical architecture according to a fifth embodiment of the present invention.
Figure 14:
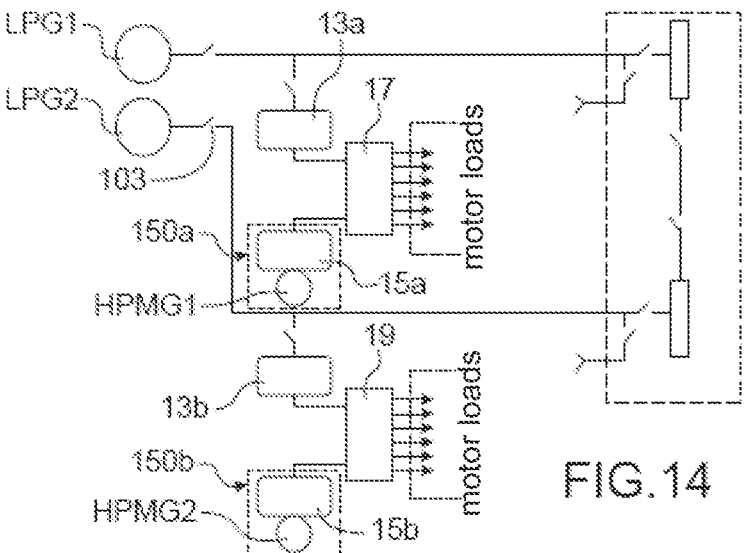
FIG. 14 shows a variant electrical architecture illustrated on FIG. 1.

The other variant architecture is given on FIG. 13. This variant differs from the previous one in particular in that the auxiliary source is omitted. An operating mode by power balancing between the electrical power supplied by the machine LPG associated with the low-pressure shaft and the electrical power supplied by the machine HPMG associated with the high-pressure shaft is here also possible. The AC/AC converter 130 can, there also, be in the form of 2 successive AC/DC and DC/AC converters or a single direct converter, for example of the matrix or cycloconverter type. Such a variant is adapted in particular to a turbine engine without electrification of the motor domestic loads and for which electric starting is not necessary.

One or other of the electricity generation architectures described previously can adapt to a conventional aeroplane AC electrical network with variable frequency while using a smaller number of items of equipment and providing components that fulfil several functions.

Thus, with an architecture as described above, in this way AC generation to the aeroplane is kept while offering the turbine engine the possibility of benefiting from taking off from the two HP and LP shafts and, in particular for 1, 10-12, 14, to implement various hybridisation scenarios.

The invention claimed is:

1. An electrical architecture for an aircraft with thermal/electrical hybrid propulsion, said aircraft including two turbine engines, said architecture comprising, for each turbine engine:

an aeroplane AC electrical network including a non-propulsion distribution network, at least one first electrical machine mechanically coupled to a high-pressure shaft of said turbine engine, said first electrical machine being configured to operate in motor mode in order to supply mechanical propulsion power and in generator mode to receive mechanical power and supply electrical power, at least one second electrical machine mechanically coupled to a low-pressure shaft of said turbine engine and configured in generator mode to receive mechanical power and supply electrical power, a reversible AC/AC electrical energy conversion module arranged between at least one first network portion able to be coupled to the first electrical machine and to at least one second network portion able to be coupled to the second electrical machine, switch elements, an electronic system controlling the conversion module and said switch elements, the electronic control system being provided with a motor control unit, the electronic control system configured to put said architecture:

in at least one so-called "power distribution hybridisation" operating mode corresponding to a first configuration of the switch elements in which said at least one second machine is coupled to the aeroplane network and at least one first machine is coupled to the aeroplane network via the electrical energy conversion module, wherein the AC/AC electrical energy conversion module is formed by a matrix AC/AC converter formed by a matrix of bidirectional switches or a cycloconverter, wherein said at least one second electrical machine is formed by a regulator and a set of three stages mounted in cascade and coupled to the same turbine-engine low-pressure shaft, said set being provided:

a first stage provided with a three-phase generator with permanent magnets for supplying a regulator by means of an alternating electric current at the output of the first stage, a second stage provided with a rotating-diode exciter in order, from a DC current obtained by rectifying said alternating electric current, to supply a rectified output current, a main stage provided with a three-phase synchronous machine supplied by said rectified output current, and to produce as an output a current with a frequency proportional to the rotation speed of the low-pressure shaft.

2. Electrical architecture according to claim 1, wherein, in said "power distribution hybridisation" operating mode, wherein the respective levels of said first power and of said second power are adjustable and controlled by the motor control unit.

3. Electrical architecture according to claim 1, the electronic control system furthermore being configured to put said architecture in at least one other "assistance of the high-pressure shaft" operating mode wherein said at least one second machine is coupled to said at least one first machine via the AC/AC electrical energy conversion module in order to supply electrical energy to said at least one first machine operating in motor mode.

4. Electrical architecture according to claim 1, furthermore comprising at least one auxiliary AC electrical energy source, in particular able to be installed in a part of the body of the aircraft, the electronic control system furthermore being configured to put said architecture in at least one other so-called "motor start" operating mode, wherein the auxiliary electrical energy source is coupled to said at least one first electrical machine by means of the AC/AC electrical energy conversion means, said at least one first machine operating in motor mode.

5. Aircraft with thermal/electrical hybrid propulsion comprising two turbine engines, each turbine engine comprising at least one high-pressure shaft and one low-pressure shaft and, for each turbine engine, said aircraft comprises an electrical architecture according to claim 1.

* * * * *